(12) United States Patent
Fukasawa (10) Patent No.: US 6,466,245 B1
(45) Date of Patent: Oct. 15, 2002

(54) ROD LENS ARRAY AND OPTICAL PRINTER HEAD AND OPTICAL PRINTER USING THE SAME

(75) Inventor: Motomu Fukasawa, Iruma (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/613,279

(22) Filed: Jul. 10, 2000

(30) Foreign Application Priority Data

Jul. 14, 1999 (JP) .......................................... 11-200155

(51) Int. Cl.⁷ .......................... B41J 2/385; G03G 13/04
(52) U.S. Cl. ........................ 347/137; 347/130; 347/258
(58) Field of Search ................................ 347/137, 244, 347/258, 242, 257, 130; 359/811, 829

(56) References Cited

U.S. PATENT DOCUMENTS

| | | | |
|---|---|---|---|
| 5,023,442 A | * 6/1991 | Taniguchi et al. ...... 347/137 X |
| 5,329,403 A | 7/1994 | Fukasawa ................... 359/717 |
| 5,444,520 A | * 8/1995 | Murano ................... 347/244 X |
| 5,886,728 A | * 3/1999 | Hamada et al. ............. 347/242 |
| 5,896,162 A | * 4/1999 | Taniguchi ................... 347/244 |
| 6,025,863 A | * 2/2000 | Nakajima et al. ....... 347/242 X |

\* cited by examiner

*Primary Examiner*—Susan S. Y. Lee
(74) *Attorney, Agent, or Firm*—Fitzpatrick, Cella, Harper & Scinto

(57) ABSTRACT

A rod lens array for optical printer head includes a plurality of rod lenses arranged cyclically in a predetermined direction. The rod lenses are fixed by filling a opaque substance into the gaps separating the respective rod lenses and sandwiching the rod lenses and the opaque substance with a pair of side panels. The side panels have a cyclical structure resulting in undulations at least on their surface facing the rod lenses, and the pitch of the beat generated by the cycle or arrangement of the plurality of rod lenses and the cyclical structure of the side panels is not greater that 0.6 mm or substantially infinite.

8 Claims, 7 Drawing Sheets

PITCH OF CYCLIC STRUCTURE OF FRP (mm)

ROD LENS ARRAY AND OPTICAL PRINTER HEAD AND OPTICAL PRINTER USING THE SAME

BACKGROUND OF THE INVENTION

1. Field of the Invention

This invention relates to a rod lens array and also to an optical printer head and an optical printer using such rod lens array. A rod lens array according to the invention is adapted to cause a plurality of light emitting elements to emit light and form highly accurate and sharp images of the elements on the surface of a photosensitive member that operates as a recording medium. A rod lens array according to the invention can suitably be used in an optical printer head or an optical printer comprising an LCD (liquid crystal display elements) or LEDs (light emitting diodes) to name a few.

2. Related Background Art

Rod lens arrays are known as conventional oblong imaging element arrays that are used in liquid crystal printers and LED printers for forming a correct life-size image of an object. A rod lens array is prepared by arranging a plurality of rod lenses cyclically in a predetermined direction, which rod lenses radially exhibit a refractive index distribution.

Figure 1:
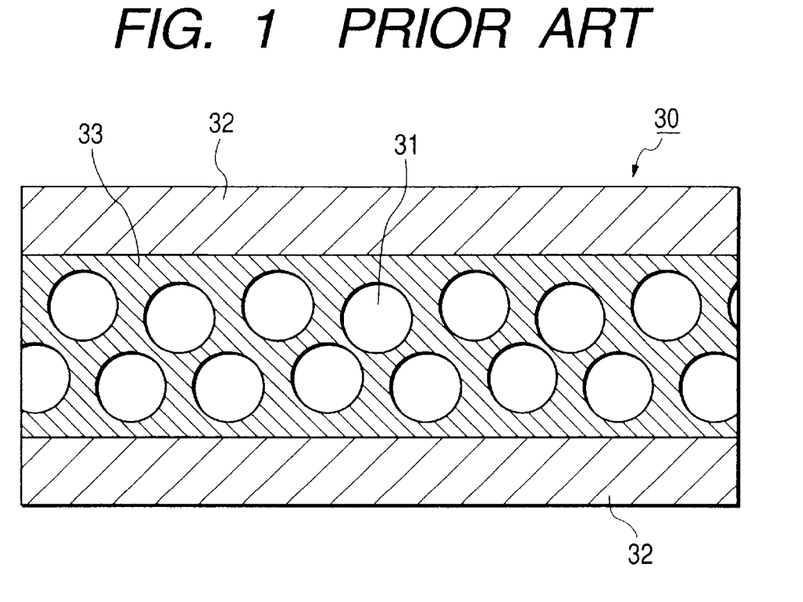
FIG. 1 is a schematic cross sectional view of a known rod lens array.

FIG. 1 of the accompanying drawings shows a schematic cross sectional view of a known rod lens array taken along a direction perpendicular to the optical axes of the rod lenses. In FIG. 1, reference symbol 30 denotes a rod lens array and reference symbol 31 denotes a rod lens. A rod lens 31 is normally formed by subjecting a rod-shaped piece of glass to an ion-exchange process so as to make it exhibit a refractive index distribution. A plurality of rod lenses 31 are densely arranged in the horizontal direction (hereinafter referred to as main-scanning direction) in two rows that are disposed one on the other in the vertical direction (hereinafter referred to as sub-scanning direction). Each of the rod lenses 31 is adapted to form a correct life-size image of an object at a position separated from it by a predetermined distance.

The plurality of rod lenses 31 are densely arranged and aligned relative to each other by means of a pair of side panels 32. Subsequently, the gaps separating the rod lenses 31 are filled with opaque resin 33 to securely hold the rod lenses in position.

Normally, the side panels 32 are made of fiber-reinforced plastic or FRP. Therefore, the surfaces of the lateral walls 32 generally show undulations of a dimension of 6 to 8 $\mu$m reflecting the profile of the interwoven fibers contained therein.

On the other hand, known rod lens arrays are often accompanied by a problem of disorder of lens arrangement as seen from FIG. 1 that arises in the manufacturing process because so many rod lenses are put there.

Figure 2:
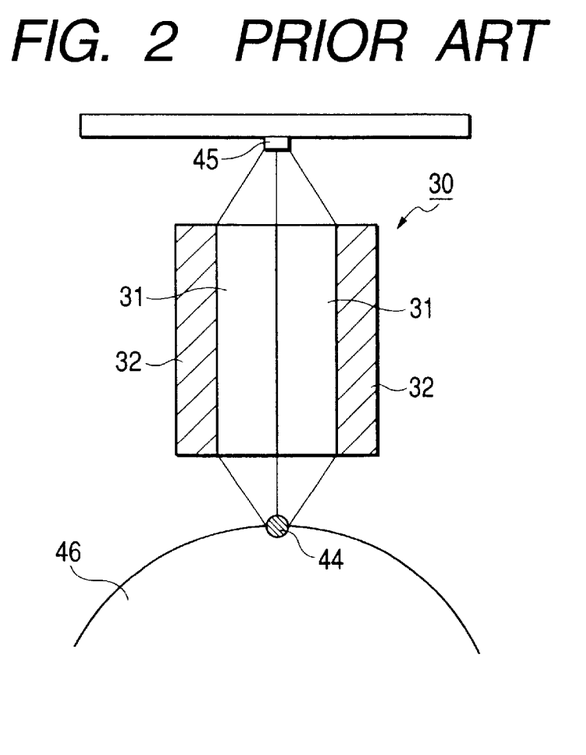
FIG. 2 is a schematic cross sectional view of a principal portion of an optical printer realized by using such a rod lens array, illustrating the image forming effect of the rod lens array in an ideal state.

FIG. 2 is a schematic cross sectional view of a principal portion of an optical printer realized by using such a rod lens array, illustrating the image forming effect of the rod lens array in an ideal state. In FIG. 2, the components the same as or similar to those in FIG. 1 are denoted respectively by the same reference symbols and will not be described any further.

Referring to FIG. 2, light emitting means (an array of light emitting elements) 45 comprises a plurality of light emitting elements that are adapted to emit respective light beams according to the image signal applied thereto. Then, the light beams are focused to respective imaging spots 44 on the surface of a photosensitive drum 46 operating as a recording medium to form a correct life-size image of an object by means of a rod lens array (imaging device) 30 comprising a plurality of rod lenses 31 arranged in an array. With this arrangement, a latent image of the object can be formed on the surface of the photosensitive drum of the optical printer. Note that the optical printer head of the optical printer includes the light emitting element array 45 and the rod lens array 30. It has been believed that such a rod lens array does not produce any disorder of imaging spots on the photosensitive drum 46 if the arrangement of the rod lenses involves disorder to a slight extent because the rod lenses form a correct life-size image.

Meanwhile, in response to the increased demand for high definition printers in recent years, optical printer heads and optical printers providing a high resolution of 600 dpi or 1,200 dpi are currently being marketed. At the same time, while high definition optical printers adapted to deal with binary data have so far been in the main stream, those adapted to produce pictorial color images are appearing in the market. In other words, halftone images are becoming more and more important to optical printers. In line with this trend, means for electrically correcting the problem of unevenness existing in the optical printer including that of an uneven distribution of the quantity of light of light-emitting dots have been devised to improve the image quality of optical printers particularly in terms of halftone images.

However, while efforts have been paid to accurately correct the problem of uneven distribution of the quantity of light, halftone images produced by optical printers have often encountered a problem of creasy marks to degrade the image quality, although the reason for this problem is still unknown. As a result of research efforts, the inventor of the present invention has found that the problem of creasy marks is different from that of the uneven distribution of the quantity of light and attributable to an inaccurate arrangement of rod lenses of the rod lens array of the optical printer.

Figure 3:
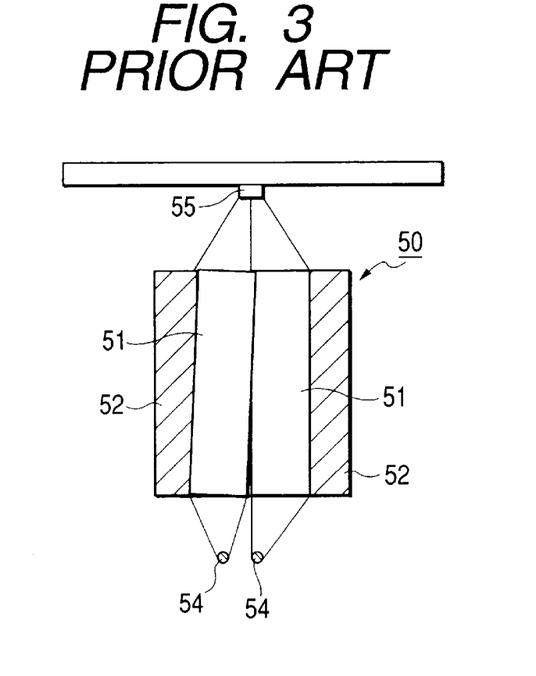
FIG. 3 is a schematic cross sectional view of a principal portion of an optical printer realized by using a rod lens array, illustrating the image forming effect of the rod lens array when some of the rod lenses 51 involve a perversive factor.

However, if a perversive factor or a distortion that can partially damage the magnification is involved in any of the rod lenses of the array as shown in FIG. 3, the light beam emitted from the rod lens involving such a problem is not focused at the right spot to give rise to a phenomenon referred to as a broken dot or a plump dot, which can give rise to creasy marks on the produced image at the time of development. FIG. 3 is a schematic cross sectional view of a principal portion of an optical printer realized by using a rod lens array, illustrating the image forming effect of the rod lens array when some of the rod lenses 51 involve a perversive factor. In FIG. 3, reference symbol 50 denotes a rod lens array and reference symbol 52 denotes a side panel, while reference symbols 55 and 54 denote a light emitting element array and a spot formed by a focused light beam, respectively.

Since known rod lens arrays are not required to have a high resolving power, the problem of a broken dot is not serious if it arises. However, in the case of an optical printer head or an optical printer required to have a resolution of 600 dpi or more, any cyclical changes in the formation of dots can result in an uneven density distribution of the obtained image that normally involves half tones to give rise to a serious problem of creasy marks.

The inventor of the present invention also found that, when the side panels are made of FRP that has a cyclical structure, the uneven density distribution of the obtained image is significantly influenced by cycle of the beat produced by the cycle of arrangement of the rod lens array and that of the cyclical structure of the side panels. This invention is based on these findings.

SUMMARY OF THE INVENTION

Therefore, it is an object of the present invention to solve the above-identified technological problems of the prior art and provide a rod lens array that is practically free from the problem of degraded image quality due to the uneven density distribution of the obtained image if it is used for an optical printer.

Another object of the present invention is to provide en optical printer head and an optical printer that can produce high quality images by using a rod lens array according to the invention.

According to the invention, the above objects are achieved by providing a rod lens array comprising:

a plurality of rod lenses arranged cyclically in a predetermined direction;

an opaque substance filled in the gaps separating the plurality of rod lenses; and a pair of side panels sandwiching the plurality of rod lenses and the opaque substance, the side panels having a cyclical structure at least at the sides thereof facing the rod lenses;

the pitch of the beat of the cycle of arrangement of the plurality of rod lenses and the cyclical structure of the side panels being not greater than 0.6 mm or substantially infinite.

According to another aspect of the invention, there is provided an optical printer head comprising:

a light emitting element array formed by arranging a plurality of light emitting elements;

a plurality of rod lenses arranged cyclically in a predetermined direction and adapted to focus the light beams emitted from the light emitting elements of the light emitting element array respectively at positions separated therefrom by a predetermined distance;

an opaque substance filled in the gaps separating the plurality of rod lenses; and a pair of side panels sandwiching the plurality of rod lenses and the opaque substance, the side panels having a cyclical structure at least at the sides thereof facing the rod lenses;

the pitch of the beat of the cycle of arrangement of the plurality of rod lenses and the cyclical structure of the side panels being not greater than 0.6 mm or substantially infinite.

According to still another aspect of the invention, there is provided an optical printer comprising:

a light emitting element array formed by arranging a plurality of light emitting elements;

a photosensitive member separated from the light emitting element array by a predetermined distance;

a plurality of rod lenses arranged cyclically in a predetermined direction and adapted to focus the light beams emitted from the light emitting elements of the light emitting element array on the photosensitive member;

an opaque substance filled in the gaps separating the plurality of rod lenses;

a pair of side panels sandwiching the plurality of rod lenses and the opaque substance, the side panels having a cyclical structure at least at the sides thereof facing the rod lenses;

a developing unit for developing an electrostatic latent image formed on the photosensitive member by irradiating the photosensitive member with the light beams emitted from the light emitting elements to a toner image;

a transfer unit for transferring the developed toner image onto an image receiving member; and a fixing unit for fixing the transferred toner image on the image receiving member;

the pitch of the beat of the cycle of arrangement of the plurality of rod lenses and the cyclical structure of the side panels being not greater than 0.6 mm or substantially infinite.

DETAILED DESCRIPTION OF THE PREFERRED EMBODIMENTS

Figure 4:
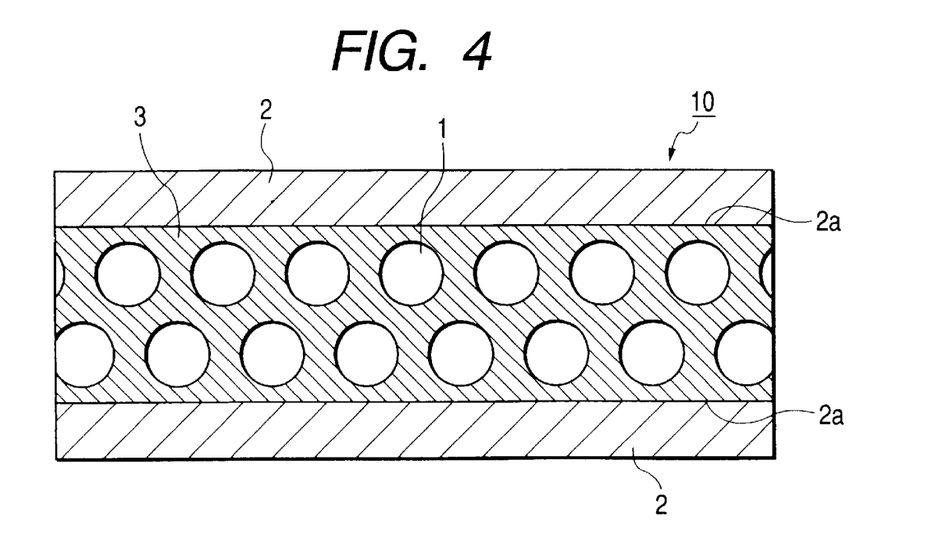
FIG. 4 is a schematic cross sectional view of an embodiment of rod lens array according to the invention.

FIG. 4 is a schematic cross sectional view of an embodiment of rod lens array according to the invention taken along a direction perpendicular to the rod lens array.

Referring to FIG. 4, the rod lens array operating as an imaging device is generally denoted by reference symbol 10. The rod lens array 10 is adapted to be used in an optical printer to form a correct life-size image of each of the light emitting elements of the light emitting element array of the optical printer on the image plane of the photosensitive member of the optical printer. As shown in FIG. 4, a plurality of rod lenses 1 are densely arranged in an array. The rod lenses 1 are substantially held in position as they are sandwiched by a pair of side panels 2 running in the direction of the array (main-scanning direction). Then, the rod lenses 1 come to be rigidly held in position as the gaps separating the rod lenses are filled with opaque resin 3.

Figure 5:
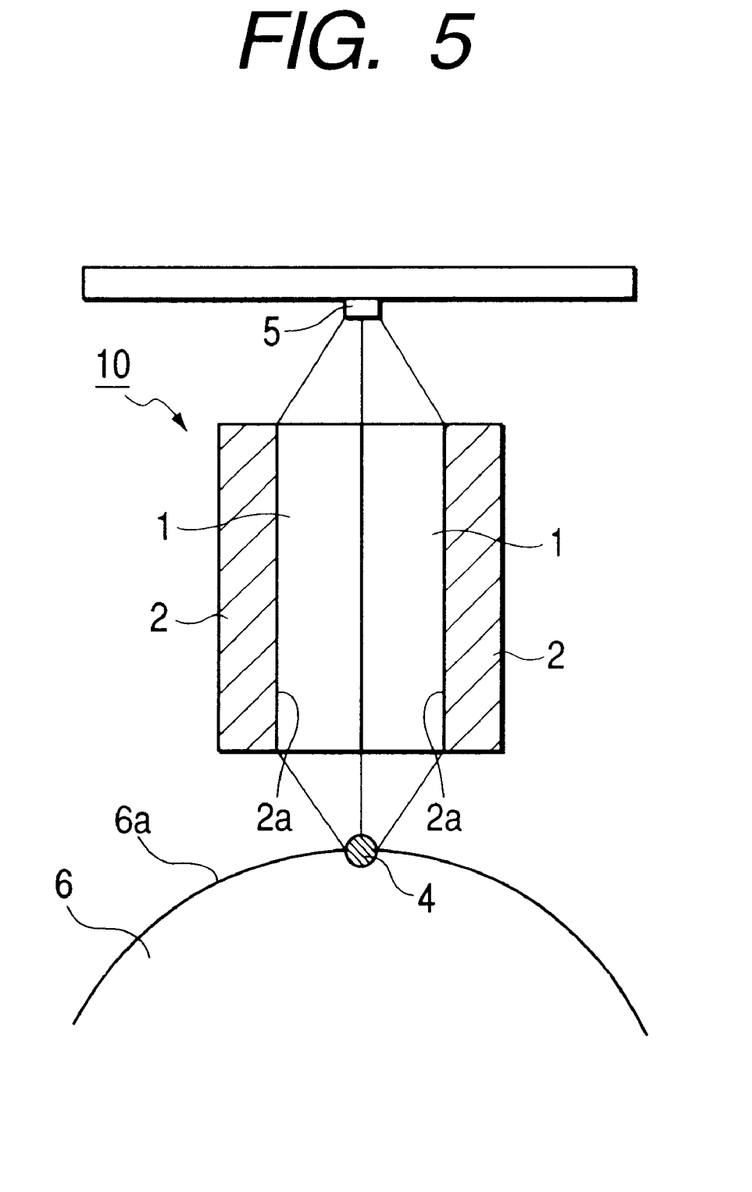
FIG. 5 is a schematic cross sectional view of a principal portion of an optical printer realized by using the embodiment of FIG. 4, illustrating the image forming effect of the rod lens array.

FIG. 5 is a schematic cross sectional view of a principal portion of an optical printer realized by using the embodiment of rod lens array of FIG. 4, illustrating the image forming effect of the rod lens array. In FIG. 5, the components that are same as those of FIG. 4 are denoted respectively by the same reference symbols and will not be described any further.

Referring to FIG. 5, light emitting means (light emitting element array) 5 comprises a plurality of light emitting elements and light beams are emitted from the respective light emitting elements according to the image signal applied thereto. The light beams are then focused by the rod lens array (imaging device) 10 comprising a plurality of rod lenses to form a correct life-size image as an imaging spot 4 on the surface of the photosensitive drum 6 that is operating as a recording medium and arranged vis-a-vis the light emitting element array 5 with the rod lens array 10 interposed therebetween. The light emitting element array 5 and the surface of the photosensitive drum 6 have an optically conjugate relationship. As the light beams emitted from the light emitting element array 5 are focused on the surface of the photosensitive drum 6, a latent image can be formed on the surface of the photosensitive drum. Note that the light emitting element array 5 and the rod lens array 10 form an optical printer head.

The side panels 2 of this embodiment are made of fiber-reinforced plastic (FRP). The surfaces 2a of the side panels 2 facing the rod lenses 1 show cyclic undulations reflecting the profile of the interwoven fibers of the side panels.

Figure 6:
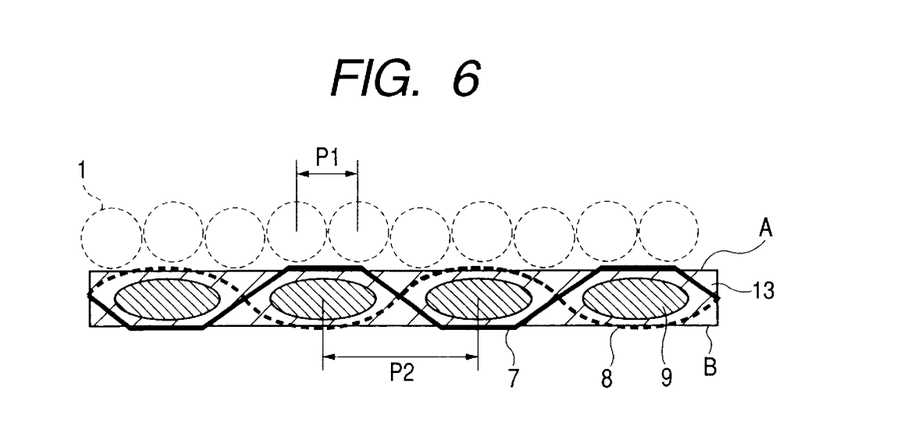
FIG. 6 is an enlarged schematic cross sectional view of a principal portion of the fiber-reinforced plastic, illustrating its structure.

Now, the structure of the side panels 2 of this embodiment will be discussed in detail. FIG. 6 is an enlarged schematic cross sectional view of a principal portion of the fiber-reinforced plastic of the side panels. Generally, fiber-reinforced plastic is supplied in the form of a sheet containing warps 9 and woofs 7 and 8 that are woven in an intertwined manner, the warps 9 extending in a direction perpendicular to FIG. 6. A binding agent 13 is filled into the void of the fibers in order to prevent any of the fibers from getting loose. The pitch of the cyclic arrangement of the warps 9 is expressed by P2.

It will be appreciated from FIG. 6 that the fiber-reinforced plastic sheet has undulations on the both surfaces A and B that are attributable to woofs 7 and 8. When rod lenses 1 are arranged on surface A of the fiber-reinforced plastic sheet, the array of the rod lenses 1 is disturbed by the undulations to give rise to a perversive factor. As pointed out earlier, such a perversive factor displaces the dots formed by the rod lenses on the photosensitive drum operating as a recording medium from the right position to consequently give rise to an uneven density distribution in the image by the optical printer.

Figure 7:
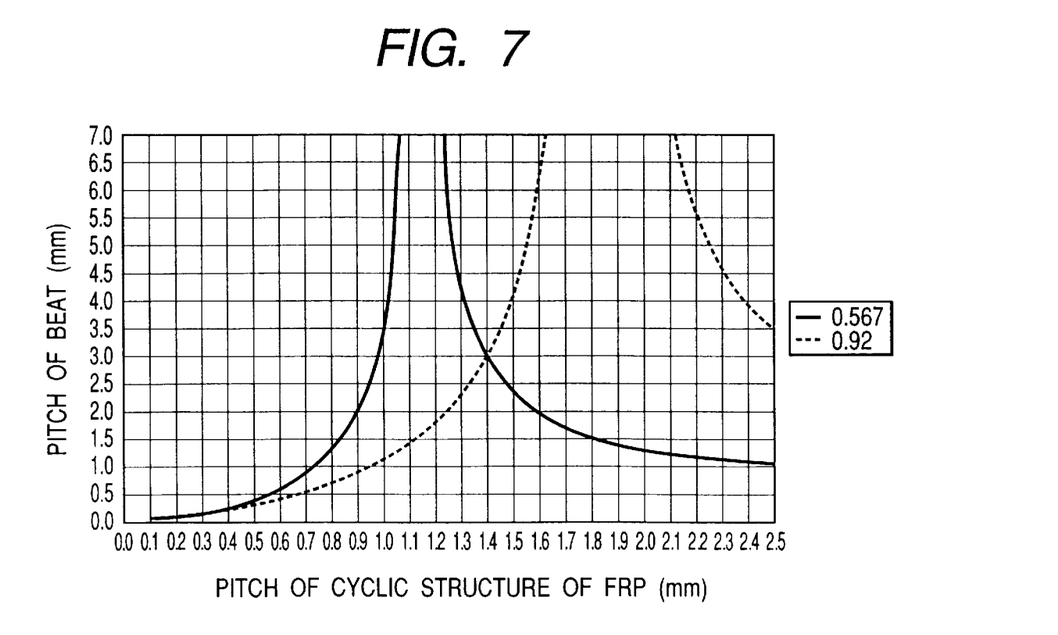
FIG. 7 is a graph showing the relationship between the cycle of fiber-reinforced plastic and that of the beat produced by it.

The uneven density distribution in the image is significantly influenced by the phenomenon of a low pitch beat that is produced by the combined effect of the pitch P1 of the cyclic arrangement of the rod lenses and that of the cyclic structure of the side panels. FIG. 7 is a graph obtained by plotting the cycles of the beats that are produced by using panels with different pitches of cyclic arrangement of fiber-reinforced plastic (FRP) and a known formula of physics. Referring to FIG. 7, the horizontal axis represents the pitch of cyclic arrangement of fiber-reinforced plastic (FRP) and the vertical axis represents the pitch of the beat. In FIG. 7, the solid lines indicate rod lenses arranged at pitch P1 of 0.567 mm and the broken lines indicate rod lenses arranged at pitch P1 of 0.92 mm.

From FIG. 7, it will be seen that a beat is generated with a pitch of 2 mm when side panels containing fiber-reinforced plastic having a cyclic structure of 2×2P=1.6 mm are used and rod lenses are arranged at a pitch of 0.567 mm. A beat is generated with a pitch of 6 mm when the same side panels are used and rod lenses are arranged at a pitch of 0.92 mm. P2 is multiplied by two above because each warp 9 is interwoven with a unit of a pair of woofs 7 and 8 whose phases are displaced by $\pi$ to make the pitch of undulations (cyclic structure) of the fiber-reinforced plastic equal to double of the pitch of arrangement of warps.

Figure 8A:
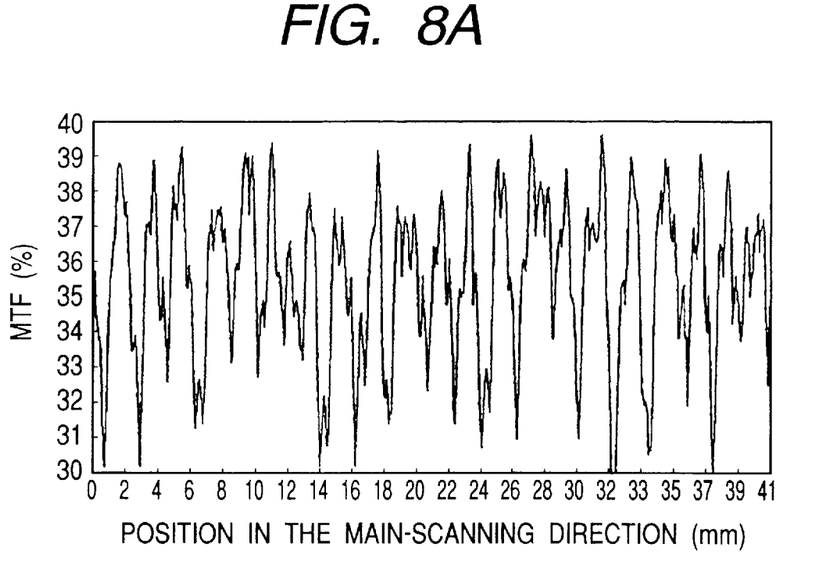
FIGS. 8A and 8B are graphs showing the dispersed imaging performance of an optical printer head realized by using fiber-reinforced plastic for the side panels.
Figure 8B:
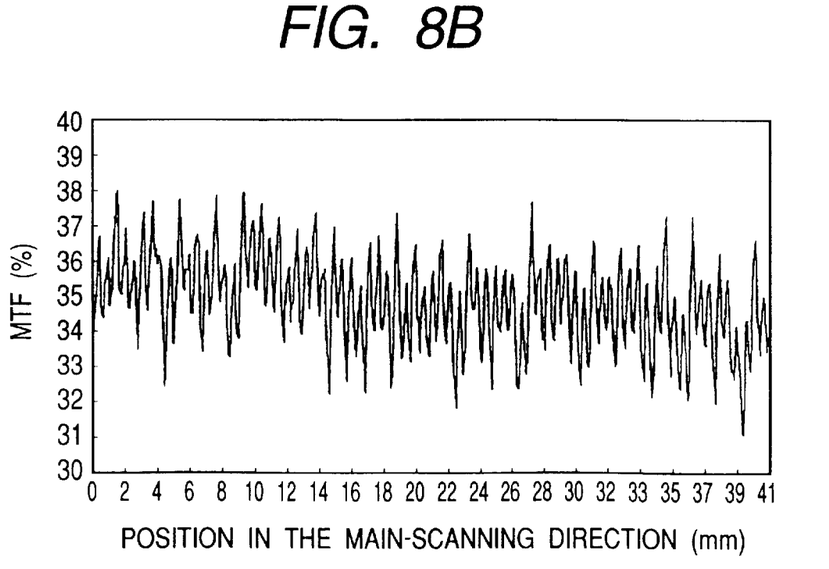

FIGS. 8A and 8B are graphs showing the dispersed imaging performance of an optical printer head realized by using fiber-reinforced plastic for the side panels. In each of the graphs of FIGS. 8A and 8B, the horizontal axis represents the distance from a terminal point of the image forming surface in the main-scanning direction, the terminal point being 0 mm point, while the vertical axis represents the modulation transfer function (MTF) of the head. The graph of FIG. 8A is obtained by using a head that produces an image that shows a remarkably uneven density distribution (and creasy marks), whereas that of FIG. 8B is obtained by using a head that produces an image that practically does not show any noticeably uneven density distribution.

Figure 9A:
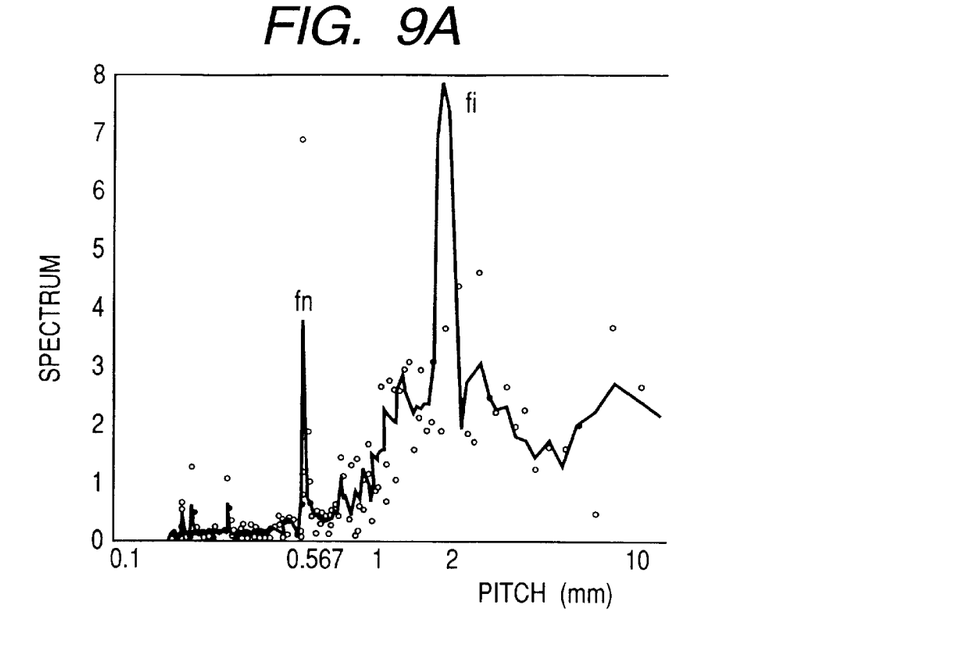
FIGS. 9A and 9B are graphs obtained respectively by subjecting the graphs of FIGS. 8A and 8B to frequency decomposition.
Figure 9B:
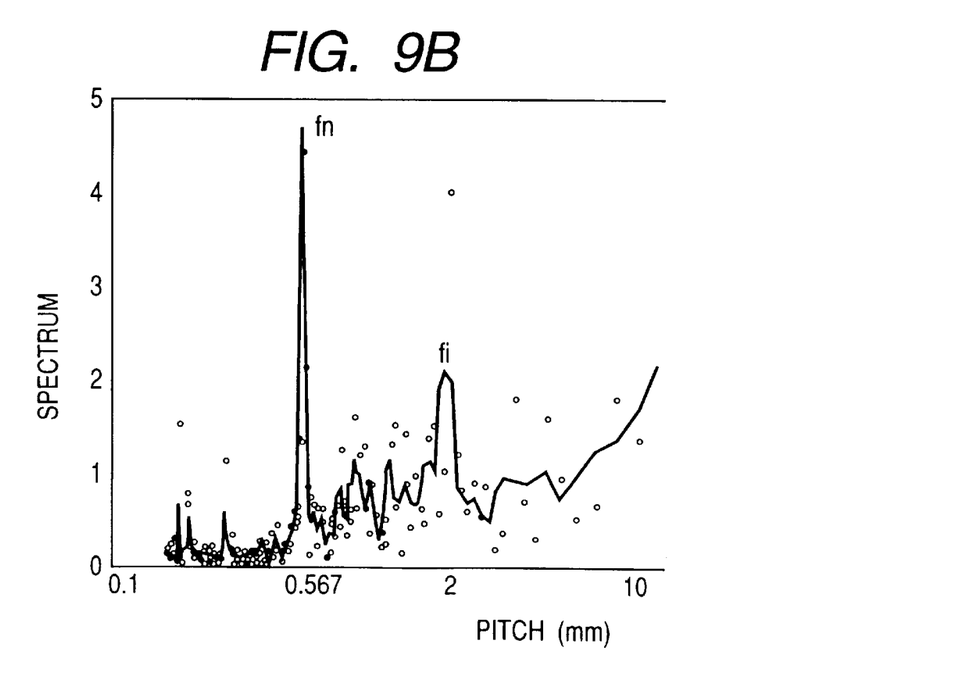

FIGS. 9A and 9B are graphs obtained respectively by subjecting the graphs of FIGS. 8A and 8B to frequency decomposition. As seen from FIG. 9A, in the case of a head showing a remarkably uneven density distribution, the peak at the pitch of 2 mm is higher than the peak at the pitch of 0.567 mm, which is equal to the pitch of arrangement of rod lenses. The peak at the pitch of 2 mm corresponds to the pitch of the beat as described above by referring to FIG. 7. The graph reveals that the arrangement of the lens array and the undulations of the side panels show an agreement of phase at the pitch of 2 mm to selectively produce a remarkable eccentricity to the rod lens there. In other words, the presence or absence of uneven density distribution in an image corresponds to the presence or absence of a high peak in the pitch of the beat of the rod lens array.

On the basis of the above fact, a rod lens array according to the invention is made to comprise a pair of side panels having a cyclic structure with which the pitch of the beat is not greater than 0.6 mm or substantially infinite. More specifically, the pitch of arrangement of the rod lenses of the rod lens array and that of weaving fibers of the fiber-reinforced plastic (equal to a half of the pitch of surface undulations) of the side panels are made to be substantially equal to each other or fiber-reinforced plastic containing fibers that are woven at a pitch smaller than a half of that of the arrangement of the rod lenses is used for the side panels. Differently stated, a rod lens array that can produce an image without any noticeably uneven density distribution can be obtained if it satisfies the requirement of either of the two formulas shown below and an optical printer comprising such a rod lens array can also produce an image without any noticeably uneven density distribution:

$$P2/P1 < 0.6$$

or $$0.9 < P2/P1 < 1.1,$$

where P1 is the pitch of arrangement of the plurality of rod lenses and P2 is the pitch of weaving fibers of the fiber-reinforced plastic (equal to a half of the pitch of surface undulations). It may be needless to say that only the surfaces of the side panels facing the rod lenses have to meet the above requirement.

Now, some exemplary numerical values are given below.

SET OF NUMERICAL VALUES: EXAMPLE 1

A pair of side panels made of fiber-reinforced plastic and having surfaces showing a pitch of cyclic structure (undulations) of 2×P2=0.68 mm were prepared. A plurality of rod lenses were arranged between the side panels at a pitch of P1=0.567 mm and the gaps separating the rod lenses were filled with black resin to form a rod lens array having a configuration as shown in FIG. 4. The rod lens array was then mounted on an optical printer as shown in FIG. 5, which was then used to print images. The printed images were observed to find no noticeably uneven density distribution (creasy marks).

SET OF NUMERICAL VALUES: EXAMPLE 2

A pair of side panels made of fiber-reinforced plastic and having surfaces showing a pitch of cyclic structure (undulations) of 2×P2=1.03 to 1.24 mm were prepared. A plurality of rod lenses were arranged between the side panels at a pitch of P1=0.567 mm and the gaps separating the rod lenses were filled with black resin to form a rod lens array having a configuration as shown in FIG. 4. The rod lens array was then mounted on an optical printer as shown in FIG. 5, which was then used to print images. The printed images were observed to find no noticeably uneven density distribution (creasy marks).

Figure 10:
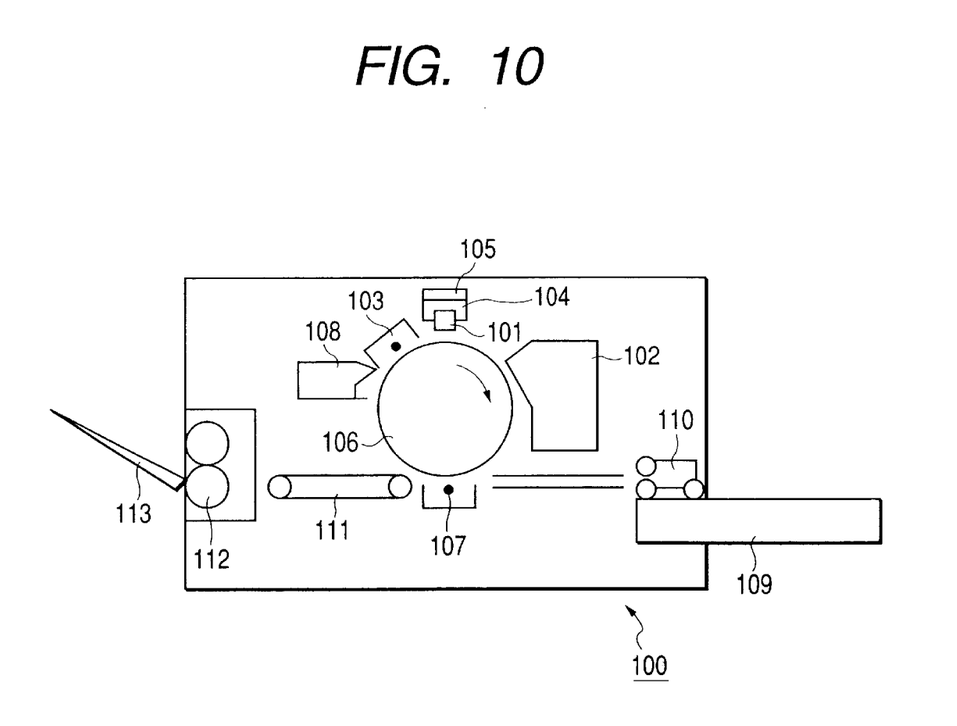
FIG. 10 is a schematic cross sectional view of an optical printer realized by using a rod lens array according to the invention.

FIG. 10 is a schematic cross sectional view of an optical printer realized by using a rod lens array according to the invention. Note that the optical printer comprises light emitting diodes (LEDs).

Referring to FIG. 10, the printer main body 100 of the optical printer contains a photosensitive drum 106 adapted to be driven to rotate clockwise in FIG. 10. A light emitting diode (LED) printer head 104 is arranged above the photosensitive drum 106 in order to expose the latter to light beams. The LED printer head 104 comprises a light emitting diode (LED) array 105 formed by arranging in an array a plurality of light emitting diodes that are adapted to emit light according to the image signal applied thereto and a rod lens array 101 formed by arranging so many rod lenses that are adapted to form a pattern of light beams emitted from the respective light emitting diodes on the photosensitive drum 106. The rod lens array 101 has the same configuration as that of the above described embodiment. The focal plane of the rod lens array 101 for the light beams emitted from the light emitting diodes is located on the surface of the photosensitive drum 106. In other words, the light emitting plane of the light emitting diodes and the photosensitive plane of the photosensitive drum are made to have an optical conjugate relationship by the rod lens array.

The photosensitive drum 106 is surrounded by an electric charger 103 for uniformly charging the surface of the photosensitive drum 106 with electricity and a developing unit 102 for causing toner to adhere to the surface of the photosensitive drum 106 to reflect the exposure pattern formed by the printer head 104 along with a transfer charger 107 for transferring the toner image formed on the photosensitive drum 106 onto a toner image receiving member (not shown) that may be a sheet of copying paper and a cleaning means 108 for collecting the residual toner remaining on the photosensitive drum 106 after the transfer of the toner image.

Additionally, the printer main body 100 is also provided with a paper cassette 109 for storing toner image receiving members, a paper feeding means 110 for feeding a toner image receiving member between the photosensitive drum 106 and the transfer charger 107 from the paper cassette 109, a fixing unit 112 for fixing the toner image transferred onto the toner image receiving member, a conveying means 111 for conveying the toner image receiving member to the fixing unit 112 and a paper delivery tray 113 for holding the toner image receiving member discharged from the fixing unit 112 in order to deliver it further to the outside.

Now, the image forming sequence of the LED printer will be described below.

Firstly, the photosensitive drum 106 is uniformly charged with electricity in advance by the electric charger 103. Meanwhile, the light emitting diodes of the LED array 105 are selectively made to emit light according to the image signal input to it from an image signal modulating means (not shown). The light beams emitted from the LED array 105 are focused on the surface of the photosensitive drum 106 by the rod lens array 101 to expose the photosensitive drum 106 with light and form a pattern of light reflecting the input image signal. As a result of the exposure, an electrostatic latent image is formed on the photosensitive drum 106 to by turn reflect the exposure pattern.

Then, toner, or a developing agent, is made to adhere to the electrostatic latent image on the photosensitive drum 106 by the developing unit 102 to make the exposure pattern visible. At the same time, a toner image receiving member is fed from the paper cassette 109 to a position near the photosensitive drum 106 by the paper feeding means 110 in synchronism with the rotary motion of the photosensitive drum 106. As the toner image receiving member passes between the photosensitive drum 106 and the transfer charger 107, the toner image on the photosensitive drum 106 is transferred onto the toner image receiving member by the transfer charger 107.

The toner image receiving member that is now carrying the toner image is then conveyed to the fixing unit 112 by the conveying means 111, where the toner image is fixed to the toner image receiving member. The toner image receiving member now carrying the fixed toner image is then discharged onto the delivery tray 113. After the transfer of the toner image onto the toner image receiving member, the residual toner remaining on the surface of the photosensitive drum 106 is removed by the cleaning means 108. The LED printer carries out an image forming operation by following the above sequence for each image it produces.

Note that the present invention is by no means limited to the above described embodiments, which may be modified in various different ways. For instance, while the side panels of the above embodiment were made of fiber-reinforced plastic, the present invention is not limited thereto and applicable to any side panels having surfaces that show a cyclic structure (undulations) of some sort or another. Such variations and modifications are found within the scope of the present invention as defined by the appended claims for patent.

What is claimed is:

1. A rod lens array comprising:
   a plurality of rod lenses arranged cyclically in a predetermined direction, wherein the cyclical arrangement of said plurality of rod lenses has a pitch;
   a substance filled in gaps separating said plurality of rod lenses: and
   a pair of side panels sandwiching said plurality of rod lenses and said substance, the side panels having a cyclical structure at least at the sides thereof facing the rod lenses, wherein the cyclical structure of said side panels has a pitch;

wherein said rod lens array satisfies one of the two formulas shown below:

$$P2/P1 < 0.6$$

or $$0.9 < P2/P1 < 1.1,$$

where P1 is the pitch of arrangement of said plurality of rod lenses and P2 is a half of the pitch of cyclical structure of the side panels.

2. A rod lens array according to claim 1, wherein said side panels are made of fiber-reinforced plastic and P2 is the pitch of arrangement of warps of the fiber-reinforced plastic, the surfaces of the side panels showing undulations due to interwoven fibers with a pitch equal to twice P2.

3. An optical printer head comprising:

a light emitting element array formed by arranging a plurality of light emitting elements;

a plurality of rod lenses arranged cyclically in a predetermined direction and focusing light beams emitted from said light emitting elements of said light emitting element array respectively at positions separated therefrom by a predetermined distance, wherein the cyclical arrangement of said plurality of rod lenses has a pitch;

a substance filled in gaps separating said plurality of rod lenses; and a pair of side panels sandwiching said plurality of rod lenses and said substance, the side panels having a cyclical structure at least at the sides thereof facing the rod lenses, wherein the cyclical arrangement of said side panels has a pitch;

wherein said optical printer head satisfies one of the two formulas shown below:

$$P2/P1 < 0.6$$

or $$0.9 < P2/P1 < 1.1,$$

where P1 is the pitch of arrangement of said plurality of rod lenses and P2 is a half of the pitch of cyclical structure of the side panels.

4. An optical printer head according to claim 3, wherein said side panels are made of fiber-reinforced plastic and said P2 is the pitch of arrangement of warps of the fiber-reinforced plastic, the surfaces of the side panels showing undulations due to interwoven fibers with a pitch equal to twice P2.

5. An optical printer head according to claim 3, wherein said light emitting element array is a light emitting diode array formed by arranging a plurality of light emitting diodes in an array.

6. An optical printer comprising:

a light emitting element array formed by arranging a plurality of light emitting elements;

a photosensitive member separated from said light emitting element array by a predetermined distance;

a plurality of rod lenses arranged cyclically in a predetermined direction and focusing light beams emitted from said light emitting elements of said light emitting element array on said photosensitive member, wherein the cyclical arrangement of said plurality of rod lenses has a pitch;

a substance filled in gaps separating said plurality of rod lenses;

a pair of side panels sandwiching said plurality of rod lenses and said substance, the side panels having a cyclical structure at least at the sides thereof facing the rod lenses wherein the cyclical arrangement of said side panels has a pitch;

a developing unit for developing an electrostatic latent image formed on said photosensitive member, by irradiating said photosensitive member with the light beams emitted from said light emitting elements, to form a developed toner image;

a transfer unit for transferring said developed toner image onto an image receiving member; and a fixing unit for fixing the transferred toner image on said image receiving member, wherein said optical printer satisfies the one of the two formulas shown below:

$$P2/P1 < 0.6$$

or $$0.9 < P2/P1 < 1.1,$$

where P1 is the pitch of arrangement of said plurality of rod lenses and P2 is a half of the pitch of cyclical structure of the side panels.

7. An optical printer according to claim 6, wherein said side panels are made of fiber-reinforced plastic and said P2 is the pitch of arrangement of warps of the fiber-reinforced plastic, the surfaces of the side panels showing undulations due to interwoven fibers with a pitch, equal to twice P2.

8. An optical printer according to claim 6, wherein said light emitting element array is a light emitting diode array formed by arranging a plurality of light emitting diodes in an array.

* * * * *

UNITED STATES PATENT AND TRADEMARK OFFICE
CERTIFICATE OF CORRECTION

PATENT NO. : 6,466,245 B1
DATED : October 15, 2002
INVENTOR(S) : Motomu Fukasawa It is certified that error appears in the above-identified patent and that said Letters Patent is hereby corrected as shown below:

Title page,
Item [57], ABSTRACT,
Line 3, "a opaque" should read -- an opaque --.
Line 10, "that" should read -- than --.

Column 2,
Line 18, "main stream" should read -- mainstream --.
Line 60, "half tones" should read -- halftones --.

Column 3,
Line 11, "en" should read -- an --.

Column 4,
Line 27, "rod" should read -- the rod --.

Column 10,
Line 31, "the one" should read -- one --.
Line 46, "pitch," should read -- pitch --.

Signed and Sealed this

Fourth Day of March, 2003

JAMES E. ROGAN
*Director of the United States Patent and Trademark Office*